United States Patent
Knobbe et al.

(10) Patent No.: US 9,154,946 B2
(45) Date of Patent: Oct. 6, 2015

(54) SECURE COUPLING OF HARDWARE COMPONENTS

(75) Inventors: Jan-Wiepke Knobbe, Groningen (NL); Jan Henk Hoepman, Groningen (NL); Hendrikus Johannes Maria Joosten, Groote Gast (NL)

(73) Assignee: Koninklijke KPN N.V., The Hague (NL)

( * ) Notice: Subject to any disclaimer, the term of this patent is extended or adjusted under 35 U.S.C. 154(b) by 416 days.

(21) Appl. No.: 13/005,310

(22) Filed: Jan. 12, 2011

(65) Prior Publication Data
US 2011/0173450 A1    Jul. 14, 2011

(30) Foreign Application Priority Data
Jan. 12, 2010 (EP) .................................. 10150493

(51) Int. Cl.
| | | |
|---|---|---|
| H04L 9/32 | (2006.01) | |
| H04K 1/00 | (2006.01) | |
| H04W 12/04 | (2009.01) | |
| H04L 9/00 | (2006.01) | |
| H04L 29/06 | (2006.01) | |
| H04W 88/02 | (2009.01) | |

(52) U.S. Cl.
CPC ............ *H04W 12/04* (2013.01); *H04L 9/00* (2013.01); *H04L 9/003* (2013.01); *H04L 9/006* (2013.01); *H04L 63/061* (2013.01); *G06F 2221/0706* (2013.01); *G06F 2221/0711* (2013.01); *H04W 88/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,985,697 | B2 * | 1/2006 | Smith et al. | 455/41.2 |
| 7,174,130 | B2 * | 2/2007 | Kurisko et al. | 455/41.2 |
| 7,216,231 | B2 * | 5/2007 | Gehrmann | 713/171 |
| 7,436,300 | B2 * | 10/2008 | Glass et al. | 340/568.1 |
| 7,706,750 | B2 * | 4/2010 | Dandekar et al. | 455/41.2 |
| 8,439,267 | B2 * | 5/2013 | Ledwith et al. | 235/472.02 |
| 2003/0050009 | A1 * | 3/2003 | Kurisko et al. | 455/41 |
| 2006/0288209 | A1 | 12/2006 | Vogler | |
| 2007/0032195 | A1 * | 2/2007 | Kurisko et al. | 455/41.2 |
| 2007/0096765 | A1 * | 5/2007 | Kagan | 324/765 |
| 2008/0003978 | A1 * | 1/2008 | Sengupta et al. | 455/410 |
| 2008/0057868 | A1 * | 3/2008 | Chang | 455/41.2 |
| 2008/0280559 | A1 * | 11/2008 | Dandekar et al. | 455/41.2 |
| 2009/0061769 | A1 * | 3/2009 | Zimbric et al. | 455/41.2 |

(Continued)

FOREIGN PATENT DOCUMENTS

EP    1662697    5/2006

OTHER PUBLICATIONS

European Search Report, European Patent Application No. 10150493.4 dated Apr. 16, 2010.

(Continued)

*Primary Examiner* — Azizul Choudhury
(74) *Attorney, Agent, or Firm* — McDonnell Boehnen Hulbert & Berghoff LLP

(57) ABSTRACT

A method and a system for securing communication between at least a first and a second hardware components of a mobile device is described. The method includes establishing a first shared secret between the first and the second hardware components during an initialization of the mobile device and, following the initialization of the mobile device, using the first shared secret or a derivative thereof to secure the communication between the first and the second hardware components.

15 Claims, 7 Drawing Sheets

(56) References Cited

U.S. PATENT DOCUMENTS

2009/0257590 A1 10/2009 Ding
2010/0005294 A1* 1/2010 Kostiainen et al. ........... 713/168

OTHER PUBLICATIONS

"3rd Generation Partnership Project; Technical Specification Group Services and System Aspects; Generic Authentication Architecture (GAA); Generic Bootstrapping Architecture (Release 7)", 3GPP TS 33.220 V7.5.0, Sep. 2006, 72 pages.

"3rd Generation Partnership Project; Technical Specification Group Services and System Aspects; 3G Security; Access Security for IP-Based Services (Release 9)", 3GPP TS 33.203 V9.3.0, Dec. 2009, 114 pages.

"3rd Generation Partnership Project; Technical Specification Group Services and System Aspects; Generic Authentication Architecture (GAA); Access to Network Application Functions Using Hypertext Transfer Protocol Over Transport Layer Security (HTTPS) (Release 6)", 3GPP TS 33.222 V6.6.0, Mar. 2006, 20 pages.

"3rd Generation Partnership Project; Technical Specification Group Services and System Aspects; Generic Authentication Architecture (GAA); Generic Bootstrapping Architecture (GBA) Push Function (Release 8)", 3GPP TS 33.223 V8.1.0, Sep. 2008, 23 pages.

Arkko, J. et al., "Extensible Authentication Protocol Method for 3rd Generation Authentication and Key Agreement (EAP-AKA)", Request for Comments 4187, Network Working Group, Jan. 2006, pp. 1-74.

* cited by examiner

SECURE COUPLING OF HARDWARE COMPONENTS

FIELD OF THE INVENTION

The invention relates to securing communications within telecommunications systems and, in particular, though not exclusively, to a method and a system for securing communication between two hardware components of a mobile device.

BACKGROUND OF THE INVENTION

The new generation mobile devices, such as smart phones, provide more and more enhanced computational functionalities via open network connections. Such mobile devices are e.g. capable of receiving e-mail, share software with one another through short-range connections, downloading and executing software from the Internet, making automated calls and act under remote control. Hence, similar to a personal computer, mobile devices and in particular the software components involved in the setting up of a connection between the mobile device to the network, are vulnerable to attacks of malicious code (malware). Typically malware attempts to make misuse of mobile device or to simply disrupt legitimate use of the mobile device.

One example of misuse includes a malware initiating the calling of premium rate telephone numbers or the sending of premium rate SMS messages without the user of the mobile device noticing this. Such a misuse can lead to unpleasant billing surprises for the user.

Another example of misuse includes making calls on the victim's expenses, e.g. by stealing the authentication data of the victim's UMTS Subscriber Identity Module (USIM) using malware on the victim's device and subsequently impersonating the victim's device.

Such a misuse is possible via a specific type of a man-in-the-middle attack, sometimes referred to as a relay attack. In a relay attack, the malware installed on the victim's device sets up a communication link to the attacker's device. The attacker can successfully impersonate himself as the victim towards the mobile network by relaying the received authentication challenge towards the malware, which, in turn, requests the victim's Universal Subscriber Identity Module (USIM) to calculate the corresponding response. Subsequently the malware sends the response to the attacker's device, which forwards it towards the network. This results in the network granting access to the attacker after which the attacker can use any service on the victim's expenses.

Such an attack is schematically presented for UMTS authentication and key agreement (AKA) in FIG. 1. As shown, in step one (different steps are illustrated in FIG. 1 with arrows having corresponding numbers), an attacker determines, via the data link that the malware has set up with the victim's mobile device or personal computer, the victim's International Mobile Subscriber Identity (IMSI). In step two, the attacker provides the IMSI to a network from which it desires to obtain a particular service (such a network is represented in FIG. 1 as a "Base Station"). In step three, the attacker receives a random value RAND from the network that it must respond to by sending a response RESP in order to obtain access to the network. The attacker also receives from the network a value AUTN, which is an authentication token sent by the UMTS network to the subscriber's USIM. In steps four and five, using the data link that the malware has set up with the victim's mobile device or PC, the attacker relays RAND and AUTN values to the USIM of the victim. The USIM then calculates the corresponding response RESP. In step six, the malware on the victim's device transmits the response RESP to the attacker who, in step 7, forwards this response to the network. After successful authentication, the network considers the attacker as the rightful subscriber allowing the attacker to set up calls or obtain other services that subsequently will be charged to the (impersonated) rightful subscriber.

Currently, the UMTS network may make use of a network authentication code (AUTN in FIG. 1) for the purpose of preventing a so called "false base station attack", which is an attack where a base station is introduced that does not belong to the network, but successfully masquerades as one. While using an authentication code successfully counters several attacks of this type, it does not prevent an attack as described above because the attacker can easily send the authentication code to the rightful subscriber through a data link that is set up by malware on the subscriber's mobile device.

As the foregoing illustrates, what is needed in the art is a technique for establishing a secure communication channel between at least the USIM and other hardware components of the mobile device.

Known prior art solutions such as disclosed in US 2006/0288209 suffer from the disadvantage that the secure communication between two components of a device is limited to hardware components wherein the security key is loaded and fixed into the components prior to the actual use of the components. This has a disadvantage that the hardware components which have been provisioned with the same security key need to be distributed together. In the case of US2006/0288209 this is easily done because it is meant for secure interprocessor communication on portable electronic devices with two processors. Hence, the components with the same security key are inherently together. However in a situation where the hardware components are not distributed together, provisioning and maintaining the relation between the components becomes very complex. For instance when the two hardware components are a mobile phone and a USIM. In this situation the mobile phone and the USIM are manufactured, distributed and sold by different organizations and there is a need to be able to create a security association between these two components regardless. The present invention provides a solution for this problem.

The prior art solutions as disclosed in US 2009/0257590 and EP1662697 rely on a technique wherein the secure communication channel between different components of a digital system are exchanged in an encrypted format. These approaches have as a disadvantage that the key pairs which are generated can also be generated by malware. Since the prior art as disclosed in US 2009/0257590 and EP1662697 either don't provide authentication of the different components or rely on pre-provisioned data the same problem arises as disclosed in the prior art of US2006/0288209. This means that any entity can generate the keypairs and push a public key to another hardware component in order to set up a secure connection, including malware, and the receiving hardware component can't distinguish this. Secondly asymmetric key operations are more complex and require more power. On mobile devices this effect is undesirable.

SUMMARY OF THE INVENTION

It is an object of the invention to reduce or eliminate at least one of the drawbacks known in the prior art and to provide in a first aspect of the invention a method for securing communication between at least a first and a second hardware components of a mobile device. The method includes establishing a first shared secret between the first and the second hardware components during an initialization of the mobile device and, following the initialization of the mobile device, using the first shared secret or a derivative thereof to secure the communication between the first and the second hardware components.

As used herein, the term "mobile device" refers to a smart phone, a personal digital assistant (PDA), a laptop or any other mobile communications device capable of providing services to a subscriber over one or more networks.

The discloses method is implemented based on allowing two hardware components, such as e.g. an identity module (USIM) and a radio card of the mobile device, to agree on a shared secret during the initialization of the mobile device. Initialization can mean that the shared secret is agreed at a first and possible subsequent power-up sessions of the mobile device, also referred to herein as a "Power On Initialization Sequence" or "POIS" mode, or during the first integration of the identity module in the mobile device and subsequent first (user) power-up of the mobile device. In the latter embodiment of the invention, the shared secret can remain locked in the mobile device such that the mobile device can only function with the first identity module integrated by the user in the mobile device. This embodiment is advantageous for example for Machine-to-Machine (M2M) applications wherein the lock-in of the first identity module in the mobile device allows for certainty that the mobile device is then only used for the (cheap) M2M network subscription. Since software applications, and, therefore, malware, are loaded after finishing the POIS mode, these applications would not be able to eavesdrop the POIS communication. Thus, assuming that the shared secret cannot be obtained from the hardware components (the first shared secret may e.g. be randomly generated by either the first or the second hardware components and securely stored in either or both of them), malware running on the device would not have the knowledge of the shared secret. The shared secret may be subsequently used in a Normal Operation mode (NO mode) to secure at least a part of the communication between the two hardware components.

In one embodiment, the first shared secret or the derivative thereof is used to modify at least part of information communicated between the first and the second hardware components. For example, to modify at least part of the information communicated from the first to the second hardware component, the first hardware component may use a modification algorithm M that uses the value of the first shared secret as a key. The second hardware component may use a corresponding modification algorithm M' that also uses the value of the first shared secret to retrieve desired information from the modified information. In this manner, the communication between the first and second hardware components is secured because the information communicated by the first hardware component may only be used by the second hardware component and not by any other hardware or software components, including malware.

In one advantageous embodiment, algorithms M and M' may be (symmetric) ciphers using the first shared secret or a derivative thereof as an encryption key. In other embodiments, algorithms M and M' may also be the bitwise XOR function, or (modular) addition or subtraction.

However, the above-described mechanism would also prevent the usage, within the mobile device, of AKA methods based on legitimate software (e.g. IMS agent software). Therefore, in one embodiment, the first shared secret or an alternative secret key may be distributed from the first and/or the second hardware components to other authorized hardware and/or software components. Subsequently, the distributed secret could be used to secure the communication between the other authorized components and the first/second hardware components.

Further, during the initialization of the mobile device, the first and/or second hardware components may establish other shared secrets with other components, provided that the other components are activated during the initialization of the mobile device and have the possibility to store the shared secret and to use it during the normal operation of the device. In this manner, a different shared secret may be established between various pairs of components during the initialization of the mobile device.

In various embodiments, the components participating in establishing and using the shared secret may include an identity module (e.g. a USIM), a radio card, a display hardware, and/or a keyboard hardware. Establishing and using a shared secret between e.g. the USIM and the keyboard hardware would assure that the input received by the USIM has been typed by a human user and is not faked or modified by malware applications. Similarly, establishing and using a shared secret between e.g. the USIM and the display hardware would assure that the information is depicted on the display of the mobile device as indicated by the USIM and not modified by the malware. In addition, establishing and using a shared secret for enciphering the communication between e.g. the USIM and the keyboard hardware, would assure that this communication, e.g. passwords, cannot be eavesdropped by malware.

In an embodiment where the first hardware component comprises an identify module and the second hardware component comprises a radio card, the step of using the first shared secret can include the radio card modifying an authentication request provided to the identity module with the first shared secret and/or the identity module modifying a response to the authentication request with the first shared secret or the derivative thereof. In this manner, on one hand, the identity module could identify the origin of incoming communications, such as authentication requests and only provide response when the authentication request is communicated by the radio card. On the other hand, the response communicated by the identity module could only be used by the radio card and not by any other hardware or software components, including malware.

Various mechanisms for establishing the first shared secret are proposed. In one embodiment, the first shared secret may be established by generating the first shared secret at the first hardware component, communicating the first shared secret from the first hardware component to the second hardware component, and receiving a confirmation at the first hardware component that the second hardware component obtained the first shared secret. In this embodiment, the first hardware component could identify that the second hardware component is not an authorized component if no confirmation is received.

In another embodiment, the first shared secret may be established by receiving a request from the second hardware component to generate the first shared secret, in response to the request, generating the first shared secret at the first hardware component, and communicating the first shared secret from the first hardware component to the second hardware component. In this embodiment, the second hardware component could identify that the first hardware component is not an authorized component if no request for generating the first shared secret is received.

In various embodiments, the first shared secret may be randomly generated by the first hardware component, by the second hardware component, or be partially generated by the first hardware component and partially generated by the second hardware component.

In addition to establishing the first shared secret, during the initialization of the mobile device, the first and second hardware components may also negotiate encryption algorithms, integrity algorithms, and/or times for applying encryption and/or integrity algorithms to be used between them.

In a further aspect, the invention relates to an identity module, preferably a smart card, for securing communication between the identity module and another hardware component of a mobile device. The identity module includes means for establishing a first shared secret between the identity module and the other hardware component during an initialization of the mobile device and means for, following the initialization of the mobile device, using the first shared secret or a derivative thereof to secure the communication between the identity module and the other hardware component.

In a further aspect the invention relates to a device, preferably a mobile device, having at least two hardware components and configured to secure communication between these hardware components. The device includes means for establishing a first shared secret between the two hardware components during an initialization of the device and means for, following the initialization of the device, using the first shared secret or a derivative thereof to secure the communication between the two hardware components.

The invention also relates to computer program product comprising software code portions configured for, when run in the memory of a mobile device, executing the method steps as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
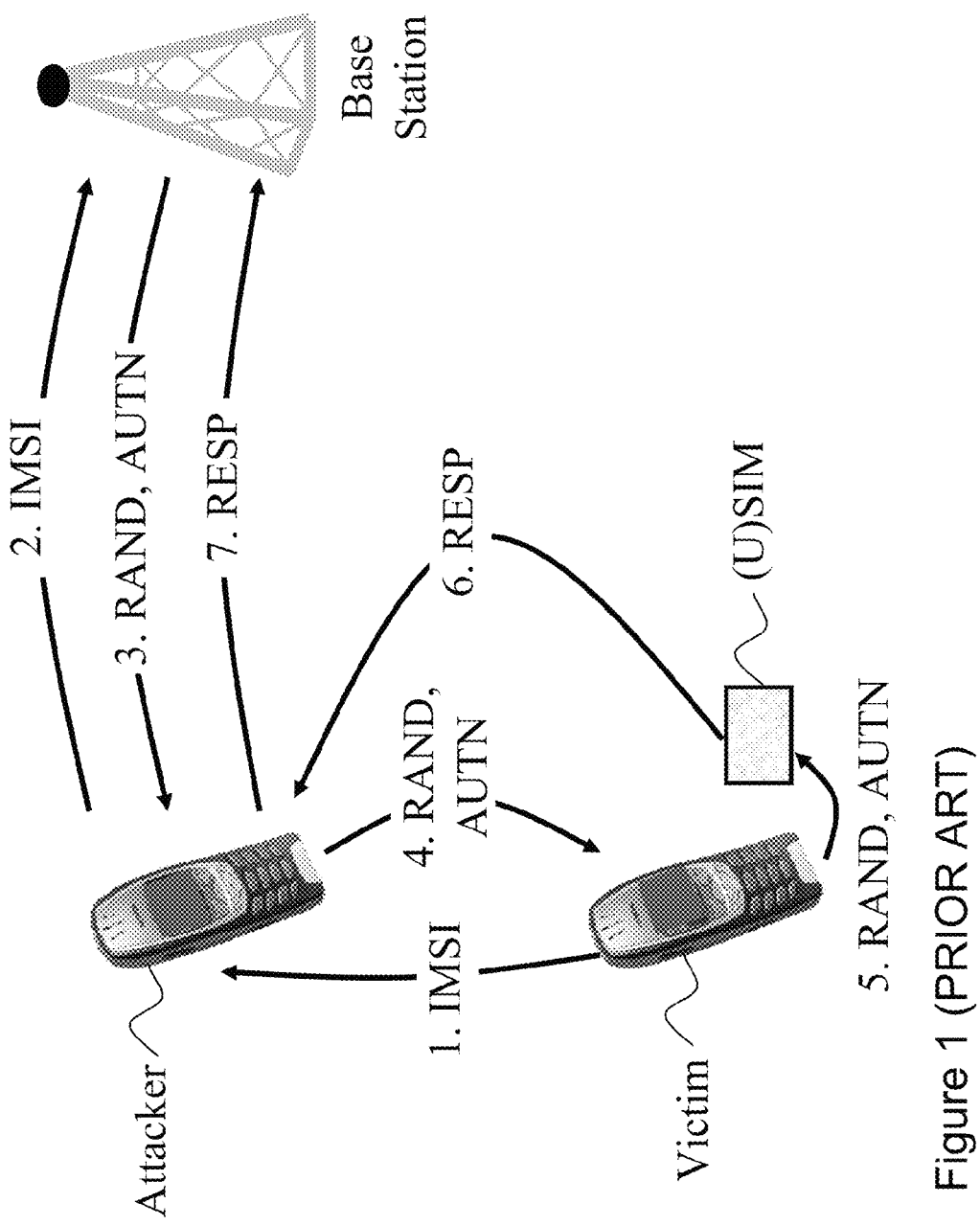
FIG. 1 depicts a schematic representation of a typical relay attack.
Figure 2:
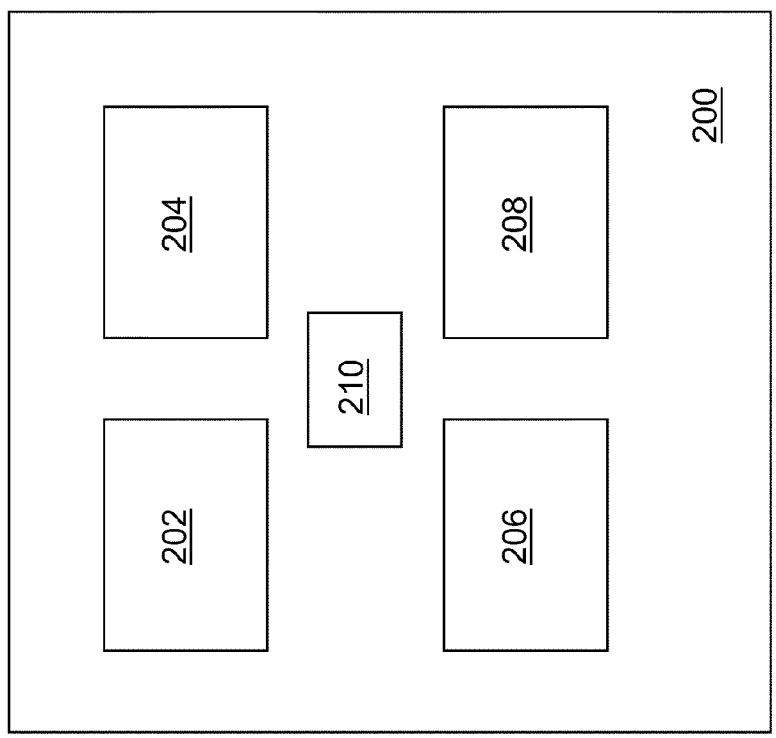
FIG. 2 depicts a mobile device according to one embodiment of the invention.

FIG. 2 depicts a mobile device 200 according to one embodiment of the invention. The mobile device 200 may be e.g. a smart phone, a PDA, a laptop or any other mobile communications device capable of providing services to a subscriber over one or more networks.

As shown, the mobile device 200 includes a first hardware component 202 and a second hardware component 204. The first hardware component 202 may be e.g. an identity module, such as a USIM card or the like. The second hardware component 204 may be e.g. a radio card providing radio contact with a base station of a network serving the mobile device.

Optionally, the mobile device 200 may further include additional components shown as a third hardware component 206 (e.g. display or keyboard hardware) and software 208 (e.g. IMS agent software).

The mobile device 200 may further comprise one or more functional units 210 (either hardware, software or a combination thereof) which include means for establishing and using a shared secret for securing communications between at least the first and second hardware components. At least parts of the functional units 210 may be disposed within the first and/or second hardware components. In the following discussions, statements that the first and/or second hardware components "establish" and/or "use" the shared secret imply that the units 210 enable the functionality of the first and second hardware components.

Figure 3:
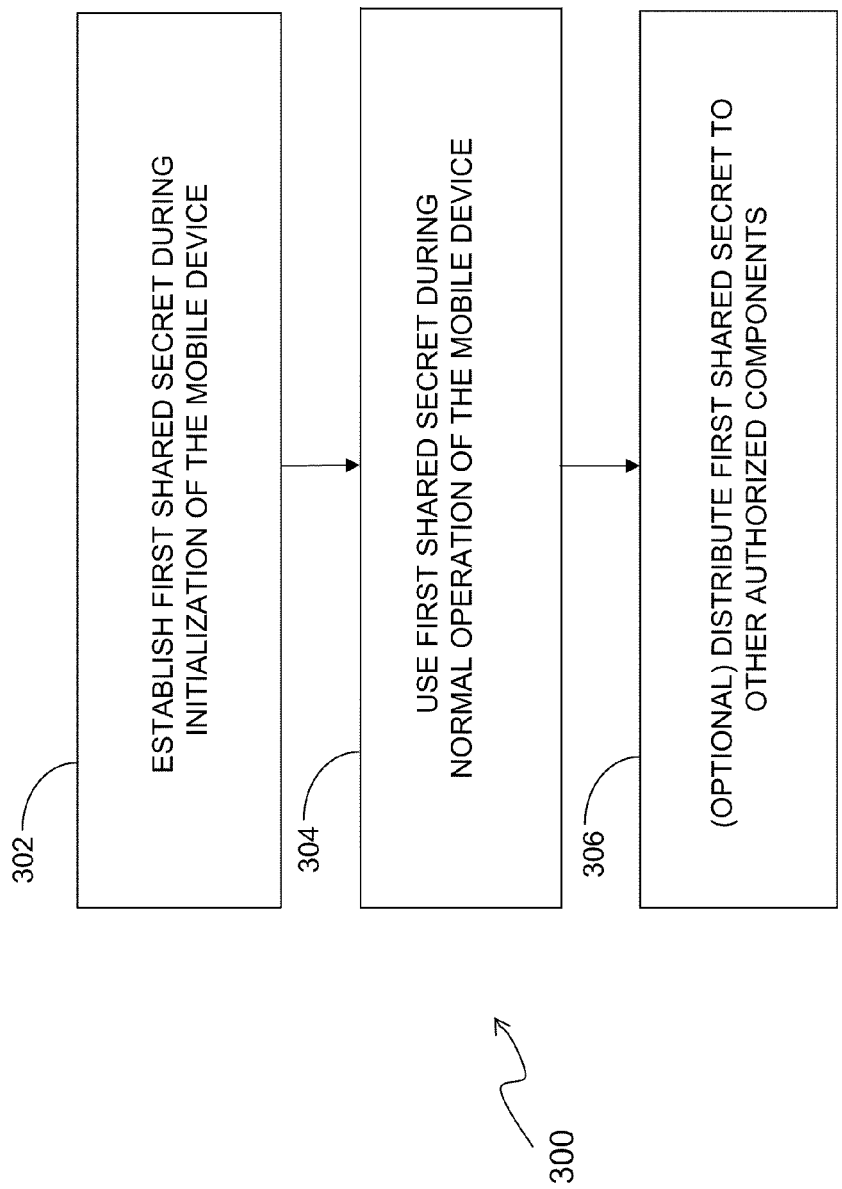
FIG. 3 illustrates a schematic flow diagram of a method for securing communication between the two hardware components of the mobile device according to one embodiment of the invention.

FIG. 3 illustrates a schematic flow diagram of a method 300 for securing communication between the first hardware component 202 and the second hardware component 204 of the mobile device 200 according to one embodiment of the invention.

The method 300 begins in step 302, where the units 210 establish a first shared secret between the first and second hardware components 202, 204. The first shared secret is established when the device is booted, or, in other words, at the POIS mode of the mobile device 200. The POIS precedes the Normal Operation (NO) mode of the mobile device 200. Because software applications, including malware, are loaded only after the POIS mode is finished, these applications cannot participate in the establishment of the first shared secret. Assuming that the first shared secret is generated and stored in such a manner that it cannot be obtained by the malware after the POIS mode is finished, establishing the first shared secret in POIS mode and subsequently using the first shared secret in NO mode allows securing communication between the first and second hardware components 202, 204.

In one embodiment, also during the POIS mode, the first and second hardware components 202, 204 may negotiate encryption algorithms, integrity algorithms, and/or when to apply encryption and/or integrity algorithms.

The method then proceeds to step 304, where, following the POIS mode (i.e., in the NO mode), the units 210 enable the first and second hardware components 202, 204 to use the first shared secret to secure at least part of communication between them.

Figure 4A:
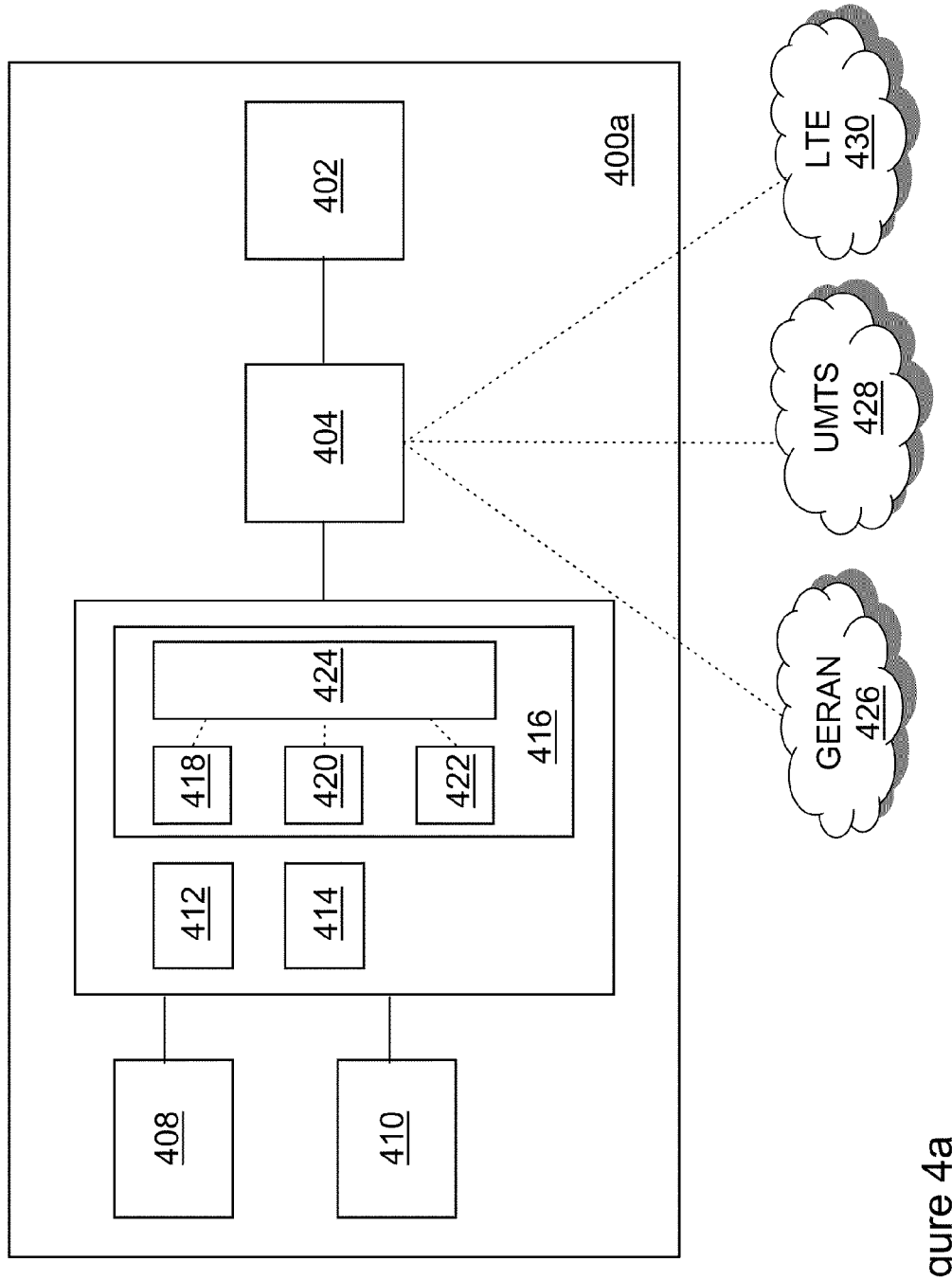
FIG. 4a depicts a chip reference architecture of a mobile device according to one embodiment of the invention.

The first shared secret can be used in NO mode in various ways to secure the communication. To illustrate some examples of using the first shared secret, consider that the first hardware component is an identity module and the second hardware component is a radio card. One type of a mobile device configured for illustrating this embodiment is depicted in FIG. 4a. As shown, a mobile device 400a (which could be an example of the mobile device 200) includes an identity module 402 (which could be an example of the first hardware component 202) and a radio card 404 (which could be an example of the second hardware component 204). The mobile device 400a further includes an application processor 406, a Bluetooth (BT) Chip 408 configured for communication with other Bluetooth enabled devices and a WiFi Chip 410 configured for accessing the Internet via a WiFi hotspot. The application processor 406 includes a number of applications, shown as application programs 412 and 414, and an Operating System (OS) 416.

The identity module 402 may be a UICC (Universal Integrated Circuit Card) for use in mobile devices suitable for 2G-type networks (GSM) or 3G-type networks (UMTS). To that end, the UICC may comprise a Subscriber Identity Module (SIM) application and/or a USIM application. Further, the USIM (and the SIM) application in the identity module 402 comprise an IMSI and an authentication key Ki for identifying and authenticating the USIM (or SIM) application to the network.

It is to be understood that the identity module 402 is not limited to SIM and/or USIM applications. In other embodiments, the identity module 402 may be an IP Multimedia Sub-system SIM (ISIM) for authenticating and accessing IMS-based services according to a predetermined IMS-based AKA as e.g. described in ETSI technical specification TS 33.203 or an extensible authentication protocol (EAP) based SIM for authenticated and accessing a network according to a predetermined EAP-based AKA as described for instance in RFC4187.

The identity module 402 may include a processor, one or more memory components e.g. ROM, RAM and/or EEPROM and I/O circuits (not shown in FIG. 4a). For authentication purposes, the UICC may comprise a secret service-subscriber authentication key K and one or more algorithms for calculating a response comprising one or more authentication parameters upon the reception of a random challenge.

The radio card 404 may be a radio card providing radio contact with a base station of a communications network serving the mobile device 400a. In one embodiment, the network may be a 2G-type mobile network (shown in FIG. 4a as GERAN 426), a 3G-type mobile network (shown in FIG. 4a as UMTS 428), or a network comprising 3GPP LTE or 3GPP SAE network elements (shown in FIG. 4a as LTE 430).

The OS 416 of the mobile device 400a comprises a kernel 424 which manages the resources of the mobile device e.g. the Central Processing Unit (CPU), memory for storing program instructions and data and Input/Output (I/O) devices such as the radio module. Further, the OS comprises Application Programming Interfaces (APIs), such as e.g. BT API 418, a WiFi API 420, and a Generic Bootstrapping Architecture (GBA) API 422, through which application programs 412 and 414 may access services offered by the OS 416.

There are several legitimate ways to access the identity module 402 and request an authentication response. One way comprises accessing the identity module 402 via radio card-initiated authentication requests, e.g. for accessing GERAN, UMTS, LTE networks (i.e. via the corresponding radio antenna attached to the mobile device). Another way comprises accessing the identity module 402 via software-initiated authentication requests, e.g. for accessing IMS, GPRS over WiFi (using the WiFi Chip 410) or for using the GBA mechanisms to access a web service. In these cases, the kernel 424 and the identity module 402 communicate via the radio-card 404. Yet another way comprises accessing the identity module 402 via BT-initiated authentication requests. Here the Bluetooth chip in the mobile device initiates the authentication request.

Note that, in the embodiment of FIG. 4a, not-radio card-initiated authentication requests are transferred to the identity module 402 via the radio card 404. In such an embodiment, the identity module 402 can use the first shared secret to modify all or part of the outgoing communication data, e.g. the response to an authentication request. The communication data would first be computed as usual, after which the identity module 402 may modify the data by means of a modification algorithm M that uses the value of the first shared secret. The radio card 404 then would use a corresponding modification algorithm M' that also uses the value of the first shared secret to retrieve the data from the modified data. M and M' could be (symmetric) ciphers using the first shared secret as the encryption key, but could also be the bitwise XOR function, or (modular) addition or subtraction. In this manner, the identity module 402 can be assured that the outgoing communication can only be used by the radio card 404 and not by any other hardware or software component, e.g. malware, because only the radio card 404 possesses the first shared secret for applying the corresponding modification algorithm M'.

Figure 4B:
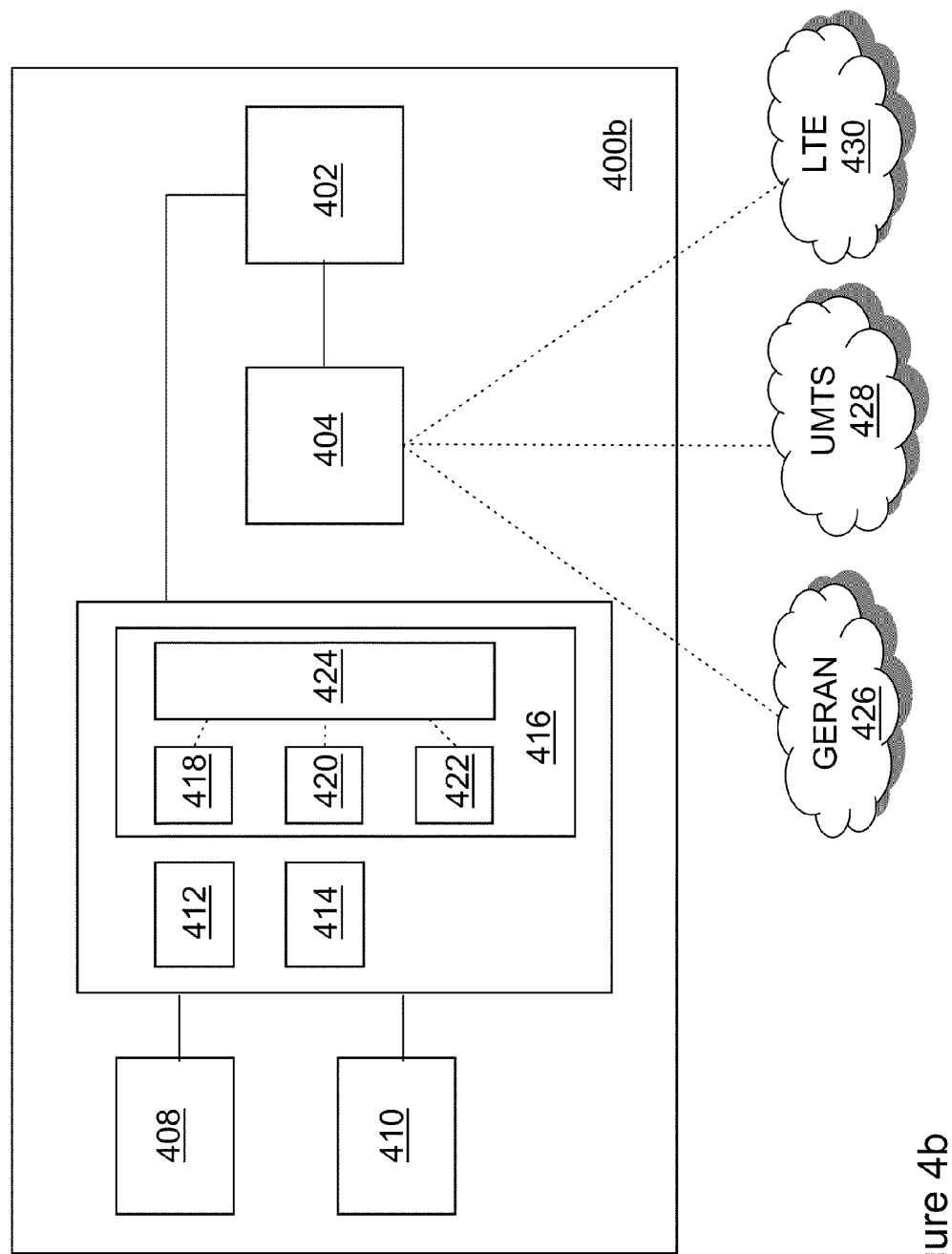
FIG. 4b depicts a chip reference architecture of a mobile device according to another embodiment of the invention.

FIG. 4b illustrates a mobile device 400b. The description of the mobile device 400a applies to the mobile device 400a, except that, in this embodiment, not-radio card-initiated authentication requests are not transferred to the identity module 402 via the radio card 404. In the mobile device 400b, the method of using the first shared secret in the NO mode described above for FIG. 4a may also be applied. Alternatively, the radio card 404 can modify all or part of the outgoing communication data towards the identity module 402, e.g. an authentication request. In this embodiment, a similar modification mechanism as described above could be applied. Alternatively, a keyed hash using the first shared secret can be added to the data. In this manner, the identity module 402 can be assured of the origin of incoming communications, e.g. authentication requests. This information could be used by the identity module 402 to decide whether or not to give a response or to first request additional information, e.g. from the subscriber or the Trusted Platform Module (TPM).

Persons skilled in the art will recognize that other chip architectures may be implemented in the mobile devices, where e.g. the radio card 404 and the identity module 402 are not directly connected, software application access the identity module 402 not via the radio card, etc. Further, a combination of the two embodiments described above for using the first shared secret is also possible.

The embodiments of using the shared secret described above could allow the identity module to counteract relay attacks by assuring that usable authentication responses can only be used by the radio card and not by applications.

Of course, these embodiments would also prevent the legitimate software (e.g. IMS agent software) from using the authentication responses to implement software based AKA methods. Therefore, returning back to the method 300 of FIG. 3, in one embodiment, the method 300 may include an optional step 306 where the first and/or second hardware components distribute the first shared secret to other authorized components (e.g. other hardware components or authorized software components such as the IMS agent software). Subsequently, the first shared secret may be used to secure the communication between the first and/or second hardware components and the other authorized components (e.g. between the IMS agent software and the USIM). Relay attacks via malware on the mobile device 200 may still be counteracted if it is assured that malware applications cannot determine the first shared secret distributed to the other authorized components.

Using the described mechanisms, a shared secret can be agreed between any two components of the mobile device 200, provided that these components are activated at POIS mode and have the possibility to securely store the established shared secret and use it in normal operations. Similarly, the first and/or second hardware components 202, 204 can establish and use (different) shared secrets with various other components of the mobile device 200. For example, in one embodiment, the identity module could establish, in the POIS mode, and use, in a NO mode, a second shared secret to secure (a part of) communication between the identity module and the keyboard hardware (i.e. hardware controlling the keyboard). Such an embodiment would assure the identity module that the received input has been typed by a human user and is not faked or modified or eavesdropped by malware applications.

Alternatively, a shared secret established and used between the identity module and the display hardware (i.e. hardware controlling the display of the mobile device 200) would assure the identity module that information is depicted on the display as indicated by the identity module.

In order to avoid that the shared secret can be derived or guessed by malware applications, the shared secret may be randomly generated by either the first or the second hardware components. Below, two scenarios are described for establishing a shared secret between the two hardware components. These exemplary embodiments assume that the component generating the shared secret is the first hardware component, whereas the component receiving the shared secret is the second hardware component.

Figure 5A:
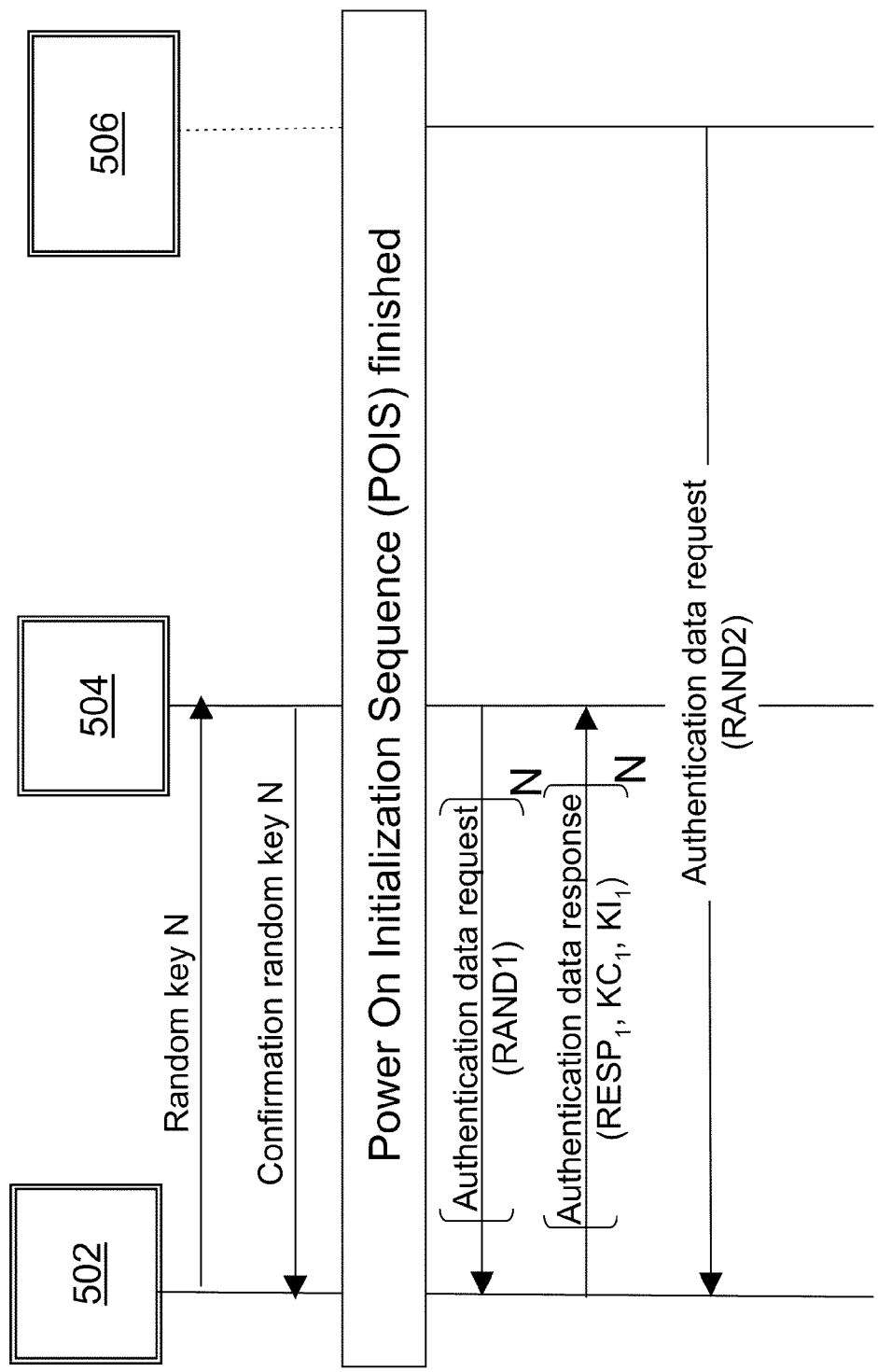
FIG. 5a illustrates a mechanism for establishing a shared secret between the first and second hardware components of the mobile device according to one embodiment of the invention.

According to the first scenario, the first hardware component may generate a new value for the shared secret at each power up of the mobile device and signal this to the second hardware component. In order to deal with backwards compatibility, the second hardware component then needs to confirm the reception. In that case, the first hardware component can determine that the second hardware component is not an authorized component if no conformation message is received. An example of such a scenario is illustrated in FIG. 5a, where the first hardware component comprises an identity module 502 (similar to the identity module 402 described above) and the second hardware component comprises a radio card 504 (similar to the radio card 404 described above). As shown in FIG. 5a, in the first step, the identity module 502 generates and provides the shared secret in the form of a random key N to the radio card 504. In response, in step 2, the radio card 504 provides a confirmation to the identity module 502 that the random key N has been received. As shown in FIG. 5a, steps 1 and 2 take place during the POIS mode. Once the POIS mode is finished, in the NO mode, in step 3, the radio card 504 may provide an authentication data request modified with the random key N, shown as $RAND1_N$, to the identity module 502. Since the identity module 502 has the random key N, it is able to obtain the unmodified authentication data request, RAND1, from the $RAND1_N$. The identity module 502 may then generate an authentication data response ($RESP_1$, $KC_1$, $KI_1$), where KC and KI are the encryption and integrity keys, respectively, and, in step 4, send the response, modified using the random key N, shown as ($RESP_1$, $KC_1$, $KI_1$)$_N$, back to the radio card 504. Since the radio card 504 has the random key N as well, it is able to obtain the unmodified authentication data response, ($RESP_1$, $KC_1$, $KI_1$), from the ($RESP_1$, $KC_1$, $KI_1$)$_N$. Note that this requires that the first and second hardware components can store the shared secret and can support associated algorithms, e.g. symmetric encryption algorithm, for applying the shared secret. When, in step 5, a malware application 506 would also send an authentication data request, RAND2, to the identity module 502, the identity module 502 would not provide a response to the malware 506 because the identity module 502 has not received a confirmation from the malware 506 about the receipt of the random key N and, therefore, can determine that the malware 506 is not authorized to receive the response. The order of steps 3, 4, and 5 is not relevant for implementing the embodiments of the present invention. Thus, step 5 may take place before or instead of steps 3 and/or 4.

Figure 5B:
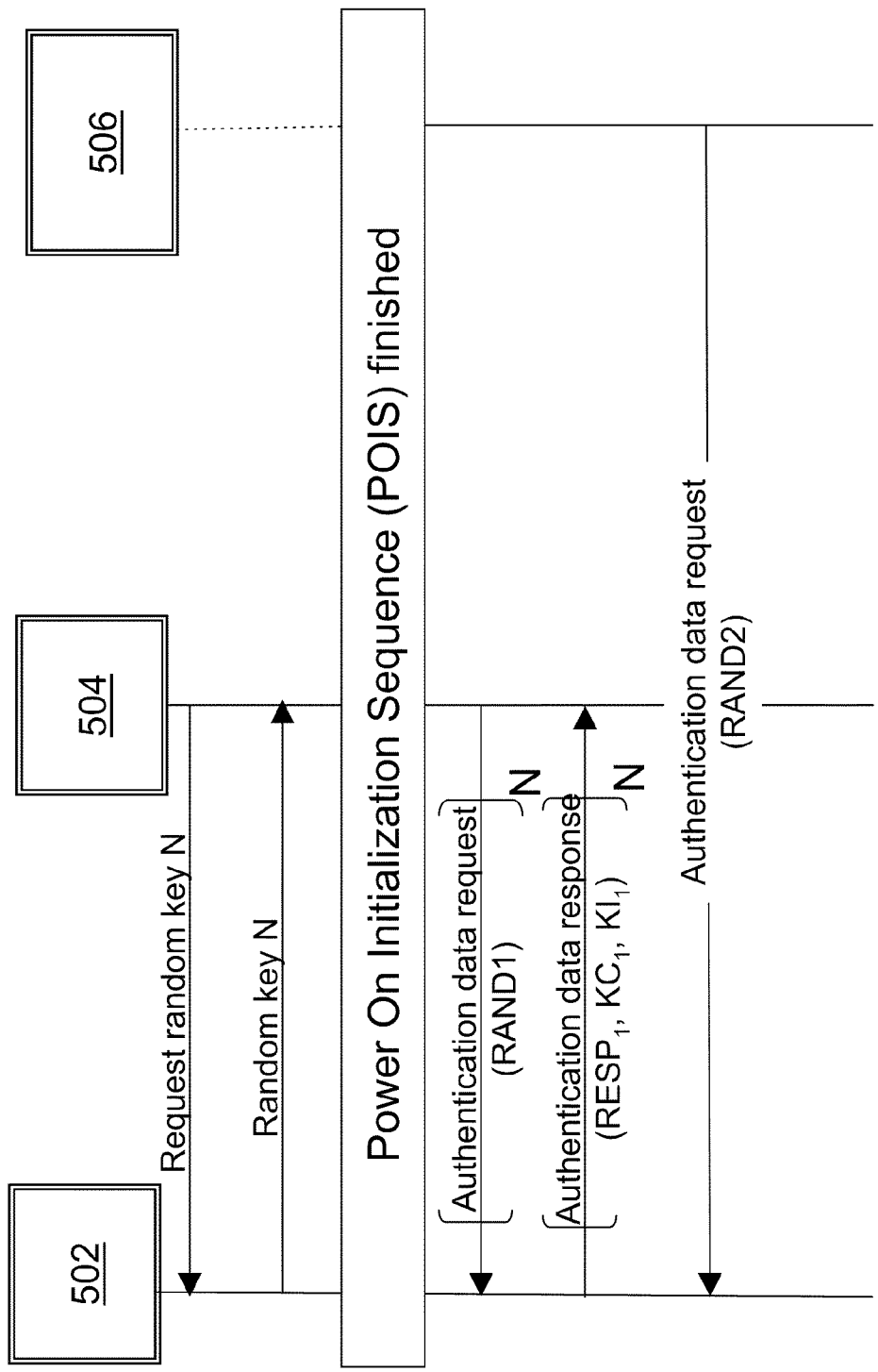
FIG. 5b illustrates a mechanism for establishing a shared secret between the first and second hardware components of the mobile device according to another embodiment of the invention.

According to the second scenario, the first hardware component may only generate a new value for the shared secret at power up of the mobile device if it is requested by the second hardware component to do so. The backwards compatibility issue can now be solved as follows. The first hardware component can determine that the second hardware component is not an authorized component if it does not receive a request to generate the shared secret. On the other hand, the second hardware component can determine that the first hardware component is not an authorized component if it does not receive an answer message containing the shared secret. An example of such a scenario is illustrated in FIG. 5b, where, similar to FIG. 5a, the first hardware component comprises the identity module 502 and the second hardware component comprises the radio card 504. As shown in FIG. 5b, in the first step, the radio card 504 sends a request to the identity module 502 to generate a shared secret. In response, in step 2, the identity module 502 generates and provides the shared secret the radio card 504 in the form of a random key N. As shown in FIG. 5b, steps 1 and 2 take place during the POIS mode. Once the POIS mode is finished, in the NO mode, steps 3, 4, and 5 may take place, similar to the corresponding steps described in FIG. 5a.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

It is to be understood that the invention may also be used with the IMS AKA (3GPP TS 33.203), in Generic Bootstrapping (GBA) applications (see 3GPP TS 33.220, 33.222, 33.223) or with the EAP AKA and/or EAP SIM in WLAN interworking applications.

Further, it is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for securing communication between at least a first and a second hardware component comprised in a mobile device configured for a first stage of operation comprising a power-on initialization and second phase of operation following the first phase, the method comprising:

generating a first secret in one of the first or second hardware components of the mobile device, the first hardware component comprising functionality for user identification, the second hardware component comprising functionality for wireless transmission;

establishing the first secret as a first shared secret between the first and the second hardware components during the power-on initialization of the mobile device in the first phase of operation and before the second phase of operation in which software is loaded; and following the power-on initialization of the mobile device, using the first shared secret or a derivative thereof to secure the communication between the first and the second hardware components.

2. The method according to claim 1, wherein the first shared secret or the derivative thereof is used to modify at least part of information communicated between the first and the second hardware components.

3. The method according to claim 2, wherein the at least part of information communicated between the first and the second hardware components is modified using at least one of a cipher, a bitwise XOR function, an addition, or a substraction.

4. The method according to claim 1, further comprising distributing the first shared secret from the first and/or the second hardware components to other authorized components.

5. The method according to claim 1, further comprising negotiating, during the initialization of the mobile device, at least one of encryption algorithms, integrity algorithms, and/or situations for applying encryption and/or integrity algorithms to be used between the first and the second hardware components.

6. The method according to claim 1, wherein the first hardware component comprises an identity module and the second hardware component comprises one of a radiocard, a display hardware, a keyboard hardware, or a Bluetooth chip.

7. The method according to claim 6, wherein the second hardware component comprises the radiocard, and wherein the step of using the first shared secret comprises at least one of:

the radiocard modifying an authentication request provided to the identity module with the first shared secret or the derivative thereof, or the identity module modifying a response to the authentication request with the first shared secret or the derivative thereof.

8. The method according to claim 1, wherein the step of establishing the first shared secret between the first and the second hardware components comprises:

generating the first shared secret at the first hardware component;

communicating the first shared secret from the first hardware component to the second hardware component; and receiving a confirmation at the first hardware component that the second hardware component obtained the first shared secret.

9. The method according to claim 1, wherein the step of establishing the first shared secret between the first and the second hardware components comprises:

receiving a request from the second hardware component to generate the first shared secret;

in response to the request, generating the first shared secret at the first hardware component; and communicating the first shared secret from the first hardware component to the second hardware component.

10. The method according to claim 1, wherein the first shared secret is randomly generated by the first and/or the second hardware components.

11. The method according to claim 1, further comprising:

establishing a second shared secret between the first hardware component and a third hardware component of the mobile device during the initialization of the mobile device; and following the initialization of the mobile device, using the second shared secret or a derivative thereof to secure communication between the first and the third hardware components.

12. The method according to claim 11, wherein the second shared secret is different from the first shared secret.

13. An identity module for securing communication in a mobile device configured for a first stage of operation comprising a power-on initialization and second phase of operation following the first phase further comprising a hardware component, the identity module comprising:

means for generating a first secret for wireless transmission of the mobile device;

means for establishing the first secret as a first shared secret between the identity module and a hardware component for wireless transmission during the power-on initialization of the mobile device in the first phase of operation and before the second phase in which software is loaded; and means for using the first shared secret following the power-on initialization of the mobile device to secure the communication between the identity module and the hardware component.

14. A mobile terminal configured for a first stage of operation comprising a power-on initialization and second phase of operation following the first phase and comprising:

a first hardware component for user identification;

a second hardware component configured to communicate with the first hardware component and comprising functionality for wireless transmission;

a functional unit for establishing a first shared secret between the first and the second hardware components during a power-on initialization of the mobile terminal in the first phase of operation and before the second phase in which software is loaded; and a functional unit for, following the power-on initialization of the mobile terminal, using the first shared secret or a derivative thereof to secure the communication between the first and the second hardware components.

15. A non-transitory computer storage medium comprising software code portions adapted for, when run in a mobile device, configuring the mobile device to execute the method steps according to claim 1.

\* \* \* \* \*

UNITED STATES PATENT AND TRADEMARK OFFICE
CERTIFICATE OF CORRECTION

PATENT NO. : 9,154,946 B2
APPLICATION NO. : 13/005310
DATED : October 6, 2015
INVENTOR(S) : Jan-Wiepke Knobbe, Jaap-Henk Hoepman and Hendrikus Johannes Maria Joosten It is certified that error appears in the above-identified patent and that said Letters Patent is hereby corrected as shown below:

On the Title Page, Item (75), Inventors:
Delete "Jan Henk Hoepman" and replace with --Jaap-Henk Hoepman--.

On the Title Page, Item (73), Assignee:
Add --Nederlandse Organisatie voor Toegepast Natuurwetenschappelijk Onderzoek TNO--.

Signed and Sealed this
Seventh Day of June, 2016

Michelle K. Lee
*Director of the United States Patent and Trademark Office*